June 26, 1951
F. P. NOFFSINGER
2,558,313
LUBRICATING MEANS FOR CONICAL ROLLERS
Filed Jan. 18, 1950
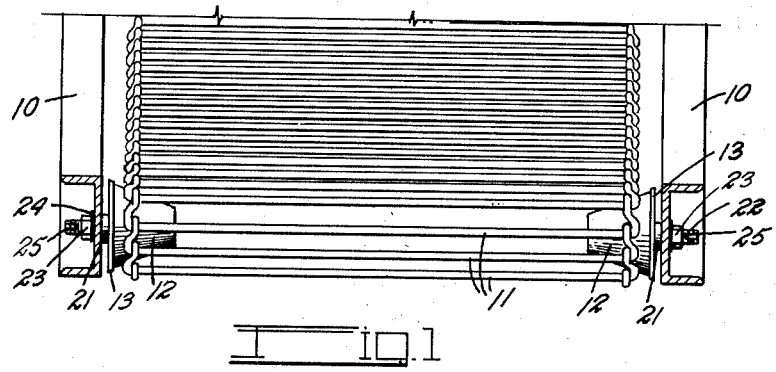
Fig.1
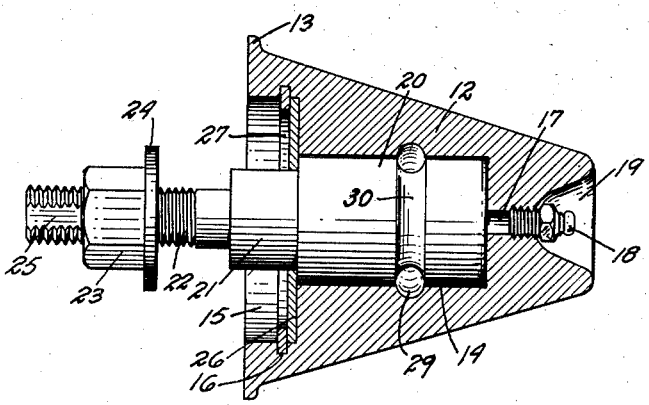
Fig.2
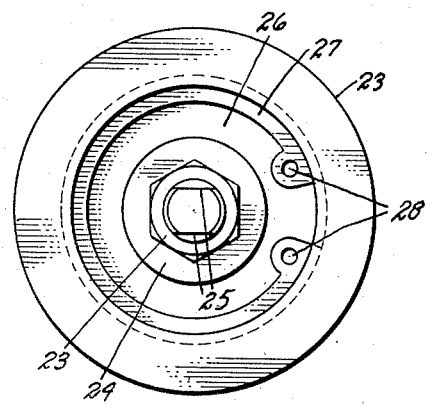
Fig.3
INVENTOR.
FRED P. NOFFSINGER
BY
ATTORNEY Patented June 26, 1951

2,558,313

UNITED STATES PATENT OFFICE 2,558,313

LUBRICATING MEANS FOR CONICAL ROLLERS

Fred P. Noffsinger, Greeley, Colo.

Application January 18, 1950, Serial No. 139,227

2 Claims. (Cl. 308—106)

This invention relates to a roller for use on potato digger chains and the like. The lower extremities of potato digger chains must operate in sand and soil. These rollers, therefore, wear out rapidly, due to the abrasion of the sand and soil particles on their bearings.

The principal object of this invention is to provide a roller for this use which will have relatively long life, and which will not be affected by the sand and soil present.

It is difficult to maintain potato digger chains in alignment with their carrying rollers, due to the fact that the chains wear rapidly and do not maintain their original length. Another object of this invention is to provide a potato digger chain roller which will automatically center the chain between its supporting rollers, regardless of wear in the chain.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 illustrates the forward extremity of a potato digger chain, illustrating the position of the improved chain rollers;

Fig. 2 is an enlarged, longitudinal section through the improved roller; and

Fig. 3 is an outside face view thereof.

In Fig. 1 the lower extremity of a conventional potato digger chain frame is indicated at 10. A conventional potato digger chain is illustrated at 11.

The improved chain roller consists of a conical roller member 12 having a peripheral flange 13 surrounding its base. The roller member 12 is bored inwardly from its base to provide a bearing bore 14, and it is counter-bored to provide a counter-bore 15 in the base. A ring groove 16 is turned in the wall of the counter-bore in spaced relation to the bottom thereof.

The bore 14 extends into the roller member 12 for substantially three-fourths of the length of the member, and the counter-bore 15 extends into the roller member 12 substantially one-sixth of the length of the latter.

A grease port 17 extends axially inward from the smaller diameter of the roller member 12 to the bore 14. A pressure grease fitting 18 is threaded into the outer extremity of the port 17. The grease fitting is contained within a protecting depression 19 in the extremity of the roller member 12.

The roller is mounted on a bearing stud consisting of an enlarged bearing portion 20 of a diameter and length equaling the diameter and length of the bearing bore 14. A shoulder portion 21 of smaller diameter projects concentrically from the bearing portion 20. The width of the portion 21 exceeds the depth of the counter-bore 15.

A threaded stud 22 projects axially from the portion 21 to receive a clamping nut 23 and washer 24. The sides of the projecting extremity of the threaded stud 22 are flattened, as shown at 25, for receiving a holding wrench.

The device is installed by passing the threaded stud 22 outwardly through the frame members 10, as shown in Fig. 1, and clamping the nut 23 thereon. The flattened portions 25 serve to hold the stud stationary while the nuts are being tightened.

The bearing member is held in place in the roller member 12 by means of a retaining disc 26 of a diameter to fit snugly within the counter-bore 15 against the bottom thereof and against the end of the bearing portion 20. The plate 26 is drilled to snugly surround the shoulder portion 21.

The plate 26 is held in place by means of an expanding snap ring 27 having tool holes 28 by means of which it may be contracted to pass into the counter-bore 15 and into the groove 16, where it expands to hold the plate 26 in place.

In use, grease is forced through the fitting 18 into the bore 14 with sufficient pressure to fill all open spaces therein. It will be noted that dirt and sand will fall upon the shoulder portion 12 and into the counter-bore 15. It will, however, be rolled from place by the rotation of the roller, so that it will not tend to enter into the bore 14. It is impossible for dirt and sand to enter the bore, however, due to the grease pressure therein and to the trap formed by the plate 26 and the shoulder between the shoulder portion 21 and the bearing portion 20.

It will be noted that when the chain 11 is trained around two of the conical rollers 12, the incline of the latter will tend to force the chain oppositely inward so as to automatically center the chain between the frame members 10.

It is desired to call attention to the fact that the incline of the rollers acting against the chain forces the rollers outwardly with relatively great pressure. This end-thrust is absorbed by the flat end of the bearing portion 26 bearing against the film of grease on the flat bottom of the bearing bore 14. There is, therefore, no thrust against the retaining disc 26.

To afford still greater protection for the thrust bearing on the end of the stud, an annular grease chamber is provided about the stud. The grease chamber is formed by coring an internal groove 29 in the bore 14 and turning an external groove 30 in the stud 20. The two grooves register with each other to form an annular grease chamber of circular cross-section, which, when filled with grease, provides a positive seal to prevent dirt and sand from reaching the flat bearing extremity of the stud and also provides a reservoir for storage of additional lubricating grease.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A roller for potato digger chains and the like, comprising: a conical roller member; a bearing bore extending into said roller member from the larger extremity thereof for a distance of substantially three-fourths the width of said roller member; a counter-bore of larger diameter than said bearing bore extending into the larger extremity of said roller member for a distance of substantially one-sixth of the width of the latter; a concave cavity extending into the smaller extremity of said roller member; a grease passage extending from said cavity into said bearing bore; a grease fitting mounted in said grease passage and positioned within said cavity; a bearing member in said bore, said bearing member having a length equal to the depth of said bore and a diameter equal to the diameter of said bore; a shoulder portion of smaller diameter than, and extending concentrically outward from, said bearing member, said shoulder portion exceeding in length the depth of said counter-bore; a retaining plate in the bottom of said counter-bore, the diameter of said retaining plate being substantially equal to the diameter of said counter-bore, said retaining plate having an opening snugly surrounding said shoulder portion; and means for holding said retaining plate in said counter-bore.

2. A roller for potato digger chains and the like, comprising: a conical roller member; a bearing bore extending into said roller member from the larger extremity thereof for a distance of substantially three-fourths the width of said roller member; a counter-bore of larger diameter than said bearing bore extending into the larger extremity of said roller member for a distance of substantially one-sixth of the width of the latter; a concave cavity extending into the smaller extremity of said roller member; a grease passage extending from said cavity into said bearing bore; a grease fitting mounted in said grease passage and positioned within said cavity; a bearing member in said bore, said bearing member having a length equal to the depth of said bore and a diameter equal to the diameter of said bore; a shoulder portion of smaller diameter than, and extending concentrically outward from, said bearing member, said shoulder portion exceeding in length the depth of said counter-bore; a retaining plate in the bottom of said counter-bore, the diameter of said retaining plate being substantially equal to the diameter of said counter-bore, said retaining plate having an opening snugly surrounding said shoulder portion; an expansible snap ring in said counter-bore acting against said retaining plate, there being a receiving groove in said counter-bore receiving said snap ring; and a threaded stud projecting axially from said shoulder portion.

FRED P. NOFFSINGER.

REFERENCES CITED

The following references are of record in the file of this patent:

UNITED STATES PATENTS

| Number | Name | Date |
|---|---|---|
| 832,360 | Billin | Oct. 2, 1906 |
| 904,112 | Baumgartner | Nov. 17, 1908 |
| 1,660,728 | Stokes | Feb. 28, 1928 |
| 2,269,887 | Sharp | Jan. 13, 1942 |